United States Patent
Sawey et al.

(10) Patent No.: US 7,545,817 B1
(45) Date of Patent: Jun. 9, 2009

(54) DATA LOOP PORT ACCELERATION CIRCUIT

(75) Inventors: David C. Sawey, Richardson, TX (US); Yung-Che Shih, Plano, TX (US); Robert T. Rumer, Camarillo, CA (US)

(73) Assignee: Vitesse Semiconductor Corporation, Camarillo, CA (US)

( * ) Notice: Subject to any disclaimer, the term of this patent is extended or adjusted under 35 U.S.C. 154(b) by 830 days.

(21) Appl. No.: 10/724,957

(22) Filed: Dec. 1, 2003

(51) Int. Cl.
*H04L 12/56* (2006.01)

(52) U.S. Cl. ....................... 370/400; 370/428

(58) Field of Classification Search ................. 370/400, 370/401, 403, 404, 405, 422, 423, 424, 428, 370/429
See application file for complete search history.

(56) References Cited

U.S. PATENT DOCUMENTS

| | | | | |
|---|---|---|---|---|
| 5,991,891 | A * | 11/1999 | Hahn et al. | 714/4 |
| 6,000,020 | A * | 12/1999 | Chin et al. | 711/162 |
| 6,118,776 | A * | 9/2000 | Berman | 370/351 |
| 6,201,787 | B1 * | 3/2001 | Baldwin et al. | 370/222 |
| 6,243,386 | B1 * | 6/2001 | Chan et al. | 370/403 |
| 6,324,181 | B1 * | 11/2001 | Wong et al. | 370/403 |
| 6,614,796 | B1 * | 9/2003 | Black et al. | 370/403 |
| 6,697,914 | B1 * | 2/2004 | Hospodor et al. | 711/112 |
| 7,012,914 | B2 * | 3/2006 | Berman | 370/351 |
| 7,092,401 | B2 * | 8/2006 | Craddock et al. | 370/412 |
| 7,340,167 | B2 * | 3/2008 | McGlaughlin | 398/45 |
| 2002/0044561 | A1 * | 4/2002 | Coffey | 370/403 |
| 2002/0044562 | A1 * | 4/2002 | Killen et al. | 370/406 |
| 2002/0067738 | A1 * | 6/2002 | Su et al. | 370/452 |
| 2003/0043834 | A1 * | 3/2003 | Mitchem et al. | 370/423 |
| 2004/0057444 | A1 * | 3/2004 | Brewer et al. | 370/403 |
| 2004/0085972 | A1 * | 5/2004 | Warren et al. | 370/401 |
| 2005/0013310 | A1 * | 1/2005 | Banker et al. | 370/401 |

* cited by examiner

*Primary Examiner*—Chi H. Pham
*Assistant Examiner*—Kevin Mew
(74) *Attorney, Agent, or Firm*—Klein, O'Neill & Singh, LLP

(57) ABSTRACT

An apparatus associated with a device connected to a data loop processes data received from the data loop to determine whether data from the data loop is to be routed back to the data loop. The apparatus may determine how to route data based on an analysis of whether the device is authorized to participate in a conversation currently associated with the data loop. Thus, latency otherwise imparted by the device when the device processes the data may be avoided.

14 Claims, 9 Drawing Sheets

DATA LOOP PORT ACCELERATION CIRCUIT

BACKGROUND

The invention relates generally to the field of data communications and, more particularly, to a system and method for improving the performance of a data loop.

A data network provides a medium that enables devices to send data to and receive data from other devices. Devices that are typically connected to a data network include computers and data storage systems.

For example, in a data storage system large amounts of information may be stored magnetically or optically on one or more disk drive-based devices (hereafter referred to for convenience as "disks"). These disks may be in locations that are remote from other disks in the system and from devices that need to access the information. Using a data network, a device such as a central computer or a server may access the information stored on each of the disks.

Several topologies are common for attaching a server to its disks. For example, a server may attach directly to the disks through several point-to-point links. One advantage of this topology is that a disk does not share its link with other disks. As a result, information may be sent to and received from a disk with low latency. However, this approach may be relatively expensive in a system that includes a large number of disks, as the server must provide an interface for each of the links.

Alternatively, a server requiring access to a large number of disks may attach to a switch fabric. This topology enables the server to access multiple drives from a single attachment point. In a switch topology, the switch examines each data frame from the server and, based on information associated with the frame, forwards the frame to one of the disks attached to the switch. Thus, because the switch forwards data directly to the appropriate destination, a switch may still provide relatively low latency data transfers to and from each disk. A disadvantage of this topology, however, is the relatively high cost of a switch.

Another common topology for connecting servers and drives is a loop topology. This topology enables a server to connect to multiple drives through a single point of attachment without incurring the expense of a switch fabric. In the loop topology, the data frame passes through each disk in turn until the destination disk is reached. Thus, a disadvantage of a loop topology compared with the other topologies is its longer latency.

As the above discussion illustrates, each of these topologies have one or more disadvantages. Accordingly, a need exists for improved methods of transferring data between devices.

SUMMARY

The invention relates to methods and systems for improving the performance of a data loop. In some embodiments of an apparatus in accordance with aspects of the invention the apparatus is associated with one or more device(s) connected to the data loop. For example, the apparatus may be inserted between the loop and the device(s). Thus, traffic flowing in the loop passes through the apparatus before flowing to the device(s), and vice versa.

In various embodiments the apparatus processes data received from the data loop to determine whether data from the data loop is to be routed back to the data loop. That is, the apparatus may immediately send the data back to the data loop rather than allow any of the associated devices to process the data and send the data back to the data loop. In this way, latency otherwise imparted by a device when the device processes the data may be avoided.

In some embodiments, the apparatus determines how to route data based on an analysis of whether an associated device is authorized to participate in a conversation currently associated with the data loop. If no associated device is participating in the current conversation, the apparatus may send all data received from the data loop data immediately back to the data loop.

In some embodiments, the apparatus incorporates one or more multiplexers to route the data back to the data loop. In this way, the data may be routed back to the loop without significant delay.

One embodiment of an apparatus constructed in accordance with aspects of the invention relates to a port acceleration circuit that reduces the latency imparted by devices in a fibre channel arbitrated loop. The port acceleration circuit may be used with existing fibre channel devices, such as disks, and host adapters that conform to the fibre channel arbitrated loop standard.

The port acceleration circuit processes the traffic flowing in the loop to determine how to route data it receives from the loop. If the traffic indicates that an associated device is authorized to participate in a conversation currently associated with the fibre channel arbitrated loop, the apparatus allows the device to process the traffic from the loop. If, on the other hand, no associated device is participating in a current conversation, the apparatus may bypass the device(s) so that the loop traffic is immediately routed back to the loop.

In some embodiments, the circuit uses the protocol defined for a fibre channel arbitrated loop to dynamically determine whether a device may be bypassed (without interrupting loop operation). For example, the circuit may process ARB and OPN primitives to determine whether an associated device has successfully arbitrated for control of the loop or has been opened by a device that has control of the loop, respectively. If either of these conditions is true, the associated device is deemed to be authorized to participate in a conversation currently associated with the fibre channel arbitrated loop.

When the port acceleration circuit is deployed in a loop environment, it may dramatically reduce the latency seen by each frame, resulting in higher overall throughput. This effect may be especially pronounced when a large number of disks are connected on the same lop. If a port acceleration circuit is associated with every disk in a loop, the frame latency performance may approach that of a fabric switched solution without the expense of a fabric switch.

In one aspect the invention provides a port acceleration apparatus for a fibre channel arbitrated loop that connects a plurality of devices, the apparatus comprising at least one fibre channel input configured to receive data from the fibre channel arbitrated loop, at least one fibre channel output configured to send data to the fibre channel arbitrated loop, at least one device input configured to receive data from at least one of the devices, at least one device output configured to send data to at least one of the devices, at least one controller configured to process at least one fibre channel primitive flowing in the fibre channel arbitrated loop to generate at least one signal indicative of whether data from the at least one fibre channel input is to be routed to the at least one fibre channel output, and at least one multiplexer configured to route, in accordance with the at least one signal, the data received by the at least one fibre channel input to the at least one fibre channel output.

In another aspect the invention provides a method for accelerating traffic flow in a fibre channel arbitrated loop that connects a plurality of devices, the method comprising receiving, from the fibre channel arbitrated loop, data comprising at least one fibre channel primitive, processing the at least one fibre channel primitive to generate at least one signal indicative of at least one source of data to be routed to the fibre channel arbitrated loop, and routing, in accordance with the at least one signal, the data received from the fibre channel arbitrated loop back to the fibre channel arbitrated loop.

In another aspect the invention provides a data routing apparatus for at least one device associated with a data loop, the apparatus comprising at least one data loop input configured to receive data from the data loop, at least one data loop output configured to send data to the data loop, at least one controller configured to process at least a portion of the data received by the at least one data loop input to generate at least one signal indicative of at least one source of data to be routed to the at least one data loop output, and at least one multiplexer configured to route to the at least one data loop output, in accordance with the at least one signal, data received by the at least one data loop input or data associated with the at least one device.

In another aspect the invention provides a method for routing data to at least one device associated with a data loop, the method comprising receiving data from the data loop, processing at least a portion of the data from the data loop to generate at least one signal indicative of at least one source of data to be routed to the data loop, and routing, in accordance with the at least one signal, data from the data loop back to the data loop.

BRIEF DESCRIPTION OF THE DRAWINGS

These and other features, aspects and advantages of the invention will be more fully understood when considered with respect to the following detailed description, appended claims and accompanying drawings, wherein:

DETAILED DESCRIPTION

The invention is discussed below, with reference to detailed illustrative embodiments. It will be apparent that the invention can be embodied in a wide variety of forms, some of which may appear to be quite different from those of the disclosed embodiments. Consequently, the specific structural and functional details disclosed herein are merely representative and do not necessarily limit the scope of the invention.

Figure 1:
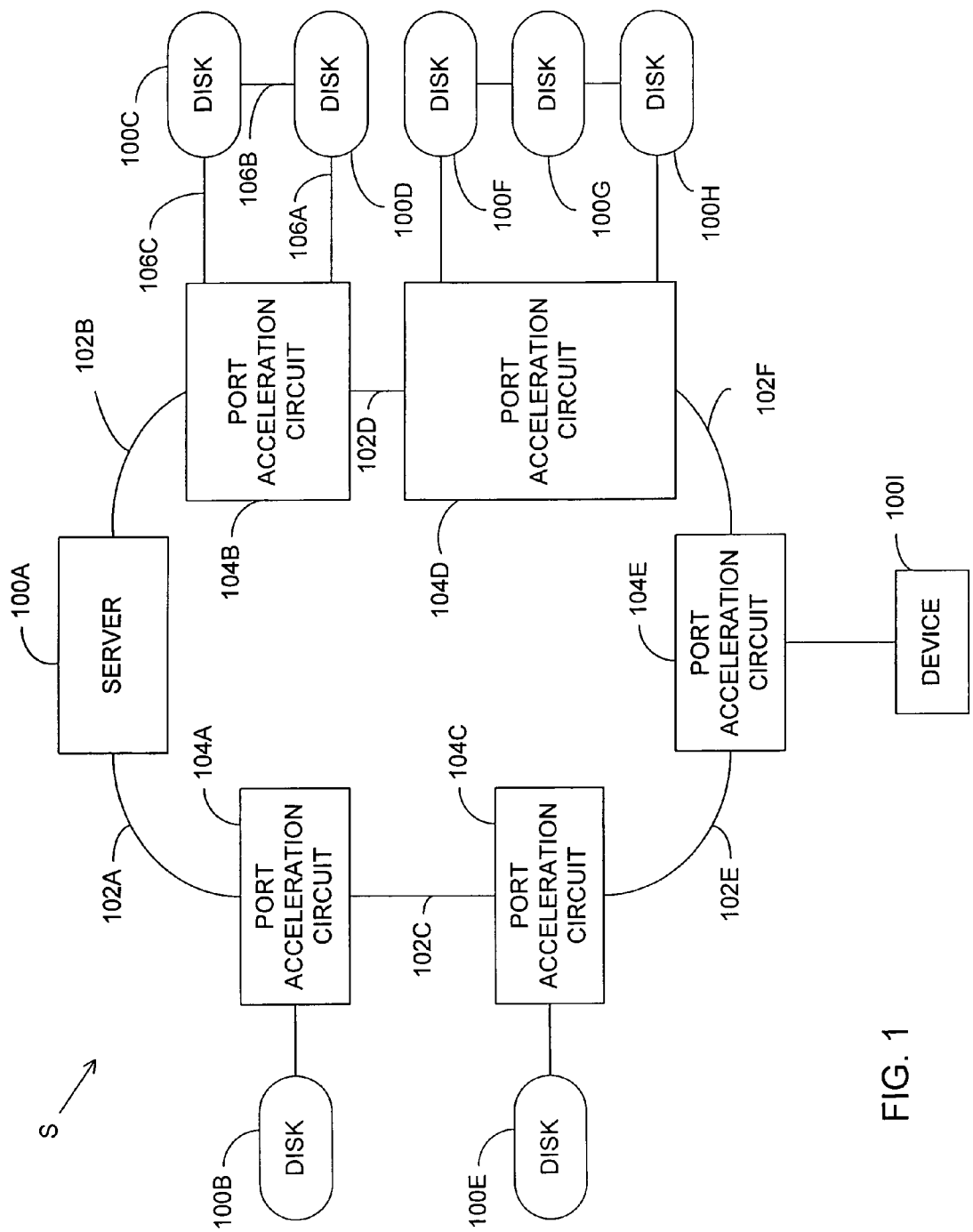
FIG. 1 is a block diagram of one embodiment of a data loop system constructed in accordance with the invention.

FIG. 1 is a block diagram of one embodiment of a system S constructed in accordance with the invention. The system S comprises a data loop that has several devices 110A-I connected to various nodes of the loop. Data flows from one device to another via a loop medium represented, in part, by the lines 102A-F.

A variety of devices such as computers and disks may connect to the loop. In a typical embodiment, a server accesses data stored on several disks via the loop. Thus, as depicted in FIG. 1, devices 100A-F may include a server 100A and its associated disks 100B-H and one or more other devices 100I.

The system S includes several port acceleration circuits 104A-E associated with several of the devices 100B-I. The port acceleration circuits 104A-E connect to the loop medium and control the flow of data between the loop and the devices 100B-I.

A port acceleration circuit may be associated with one or more device(s). For example, port acceleration circuit 104A is associated with one device, disk 100B, while port acceleration circuit 104B is associated with two disks 100C and 100D.

In some embodiments data flows to multiple disks associated with a port acceleration circuit in a loop fashion. For example, data may flow from the loop (e.g., loop segment 102D) to port acceleration circuit 104B, then to disk 100D via loop segment 106A, then to disk 100C via loop segment 106B, back to port acceleration circuit 104B via loop segment 106C, and finally back to the loop (e.g., loop segment 102B).

Figure 2:
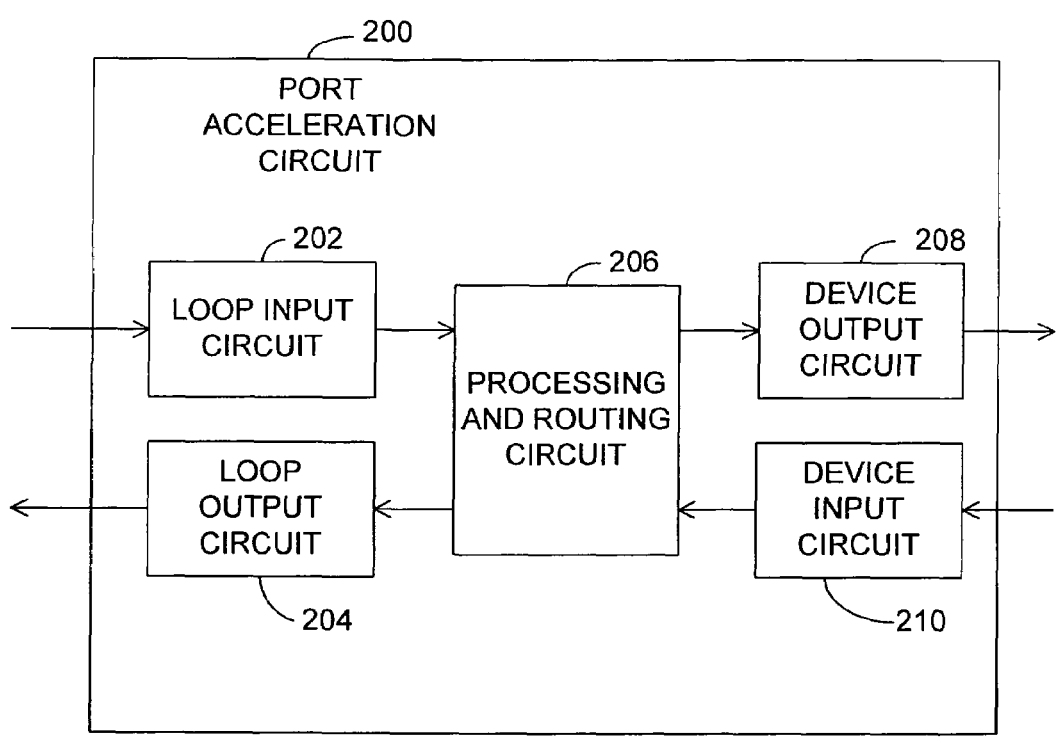
FIG. 2 is a block diagram of one embodiment of an apparatus constructed in accordance with the invention.
Figure 3:
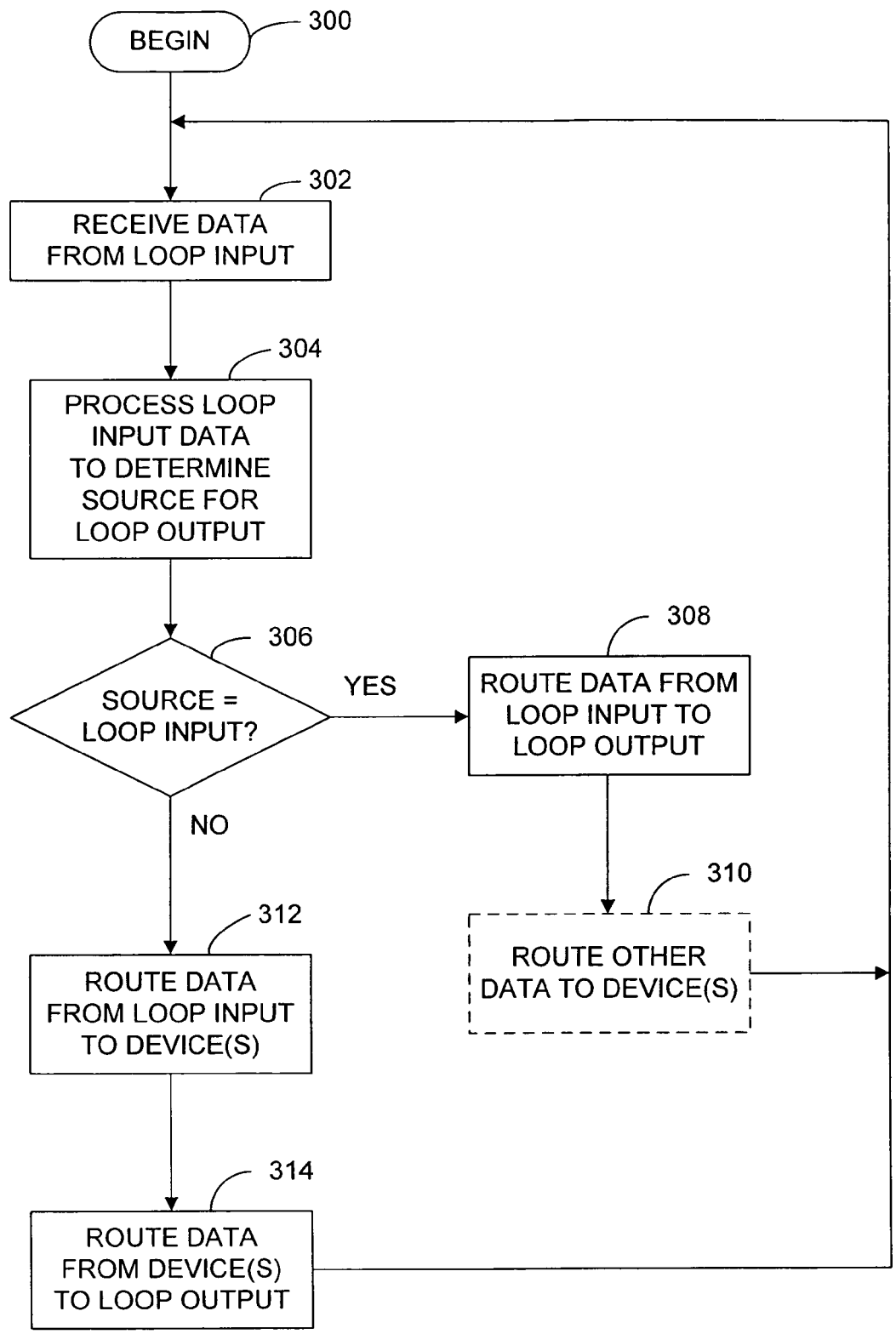
FIG. 3 is a flow diagram of data processing and routing operations that may be performed by one embodiment of an apparatus constructed in accordance with the invention.

Operations of the port acceleration circuits 104A-E will be discussed in more detail in conjunction with FIGS. 2 and 3. FIG. 2 is a high level block diagram of a port acceleration circuit 200. FIG. 3 is a high level flow diagram of operations that may be performed by one embodiment of a port acceleration circuit.

In FIG. 2, port acceleration circuit 200 includes circuits to interface with the loop and one or more device(s). These circuits include a loop input circuit 202 configured to receive data from the loop and a loop output circuit 204 configured to send data to the loop. In addition, the port acceleration circuit includes a device input circuit 210 configured to receive data from one or more device(s) and a device output circuit 208 configured to send data to one or more device(s).

A processing and routing circuit 206 processes the data received from the loop to determine how to route data between the loop and one or more device(s). An example of operations that may be performed by the port acceleration circuit 200 will now be discussed in conjunction with FIG. 3 beginning at block 300.

As represented by block 302, the port acceleration circuit 200 (FIG. 2) receives data from the loop via the loop input 202.

Next, as represented by block 304, the processing and routing circuit 206 processes the loop data to determine, for example, the source for data to be output to the loop. In one embodiment, this determination is made based on whether an associated device is currently participating in a conversation on the loop. A device may be participating in a conversation, for example, when the device has acquired control of the loop and, as a result, is sending data to other devices on the loop. In addition, a device may be participating in a conversation when another device that has control of the loop is sending data to that device.

If the device(s) associated with the port acceleration circuit 200 is/are not currently participating in a conversation on the loop the processing and routing circuit 206 may route data received from the loop input 202 immediately back to the loop output 204, as represented by blocks 306 and 308. In this way, data may be routed back to the loop without significant delay.

As represented by dashed block 310, when the loop input data is being looped back out to the loop the processing and routing circuit 206 may optionally route other data (e.g., IDLE data) to the input(s) of the device(s). In this case, the device(s) will not receive data from the loop.

The lines returning to block 302 indicate that the port acceleration circuit 200 may continually process data from the loop to determine how data is to be routed between the loop and the device(s).

As represented by blocks 306 and 312, when, for example, a device is currently participating in a conversation, the processing and routing circuit 206 routes data received from the loop input 202 to the device output 208. As a result, the data is sent to the associated device(s) thereby enabling the device participating in the conversation to process the data. In addition, the processing and routing circuit 206 routes data received from the device(s) via the device input 210 to the loop output 204 (block 314). In this situation, the port acceleration circuit 200 is, in effect, transparent to the loop and the device(s). Thus, the loop and the device(s) interact essentially as they would without a port acceleration circuit 200.

Further to this end, the port acceleration circuits may be configured to operate with legacy devices (e.g., devices 100B-F) that conform to the standard of the data loop, such as a fibre channel arbitrated loop. In this case, each of the legacy devices includes hardware, firmware and/or software to support the standard. Thus, the legacy devices include hardware to interface with the loop at the physical level. For example, the loop medium may consist of twisted pair wire, coaxial cable or optical fiber and the legacy devices may include hardware that interfaces with that medium. The legacy devices also include hardware, firmware and/or software that support protocol operations associated with the standard.

To interface with these legacy devices, the inputs and outputs of the port acceleration circuits may include hardware, firmware and/or software components to support the loop standard and interface with the devices. For example, the circuits may include hardware to interface with the loop and a devices at the physical level. This hardware may take may forms including, for example, simple wire connections or transceivers. In some embodiments the input and output circuits also may include hardware, firmware and/or software to process data flowing into the device.

In a typical loop topology, only one device is allowed to access (e.g., send data over) the loop at a given point in time. For example, a device attached to the loop may arbitrate or acquire a token to gain control of the loop. Once a device gains control, only that device (and in some embodiments devices enabled by the controlling device) may send data over the loop. The controlling device then relinquishes control of the loop to enable other devices to control the loop.

This feature of a loop may be exploited to provide an efficient method of bypassing devices that are not allowed to send data over the loop. The port acceleration circuit may monitor traffic to determine when an associated device is allowed to send data over the loop to a define a "state" of the device accordingly. Depending on the state of the associated device(s), all data passing through that node in the loop may be bypassed. Thus, the port acceleration circuit monitors changes in the state of the device(s) and alters the routing of data accordingly.

One advantage of this approach is that the destination address of the data need not be analyzed on a frame-by-frame basis. Rather, data may be automatically routed based on the current state of the device(s). For example, one or more multiplexers may be connected to the various inputs and outputs of the port acceleration circuit. The control inputs to the multiplexers are set according to the state of the device(s). Thus, the multiplexers automatically route the data in a particular way, until their control inputs are changed.

One embodiment of the invention relates to a port acceleration circuit for a fibre channel arbitrated loop. An overview of the fibre channel arbitrated loop follows.

Fibre channel arbitrated loop is a standard that allows up to 127 nodes to attach in a loop topology. This standard is described in the publication: ANSI X3.272.1996, Information Technology—Fibre Channel—Arbitrated Loop ("FC-AL"), the content of which is hereby incorporated by reference herein.

The FC-AL standard defines an electrical interface and a protocol for arbitrating the loop in a fair manner. Once a node (e.g., a device connected at a node in the loop) wins arbitration, it establishes a loop tenancy that permits it to send frames to one or more destination nodes. When frame transmission completes, the node relinquishes control of the loop, allowing any other node to win arbitration and establish a loop tenancy.

In the FC-AL standard, each node in a loop is assigned a unique 8-bit address, denoted the node's Arbitrated Loop Physical Address (AL_PA). Each AL_PA value is assigned a priority level based on its equivalent decimal value.

The FC-AL standard also defines a number of 40-bit primitives that nodes use to convey information about arbitration, frame delineation and loop tenancy. The primitives ARB, OPN, CLS, and IDLE will be discussed in more detail.

The ARB primitive is an indication that a node requires access to the loop. The ARB primitive contains the physical address of the node requesting access. This primitive is written ARB(AL_PA), where AL_PA is the physical address of the requesting node. When an FC-AL node wishes to access the loop, it replaces any lower priority ARB primitives received from the loop with its own ARB(AL_PA). A node wins arbitration when it receives its own ARB(AL_PA) from the loop.

Once a node wins arbitration, it is free to send an OPN primitive to open another device on the loop. The OPN primitive contains the physical address of the destination node. This primitive is written OPNy, where 'y' is the AL_PA of the destination node. The OPM primitive informs the destination node that subsequent frames are destined for it. Following transmission of the OPN primitive, and subject to flow control, the source node may send one or more frames to the destination node.

The source node then terminates the conversation by transmitting a CLS primitive. At that time the source node may either relinquish its loop tenancy or it may OPN a new destination.

IDLE is a special primitive sent by a node that does not have any other data that needs to be transmitted.

Figure 4:
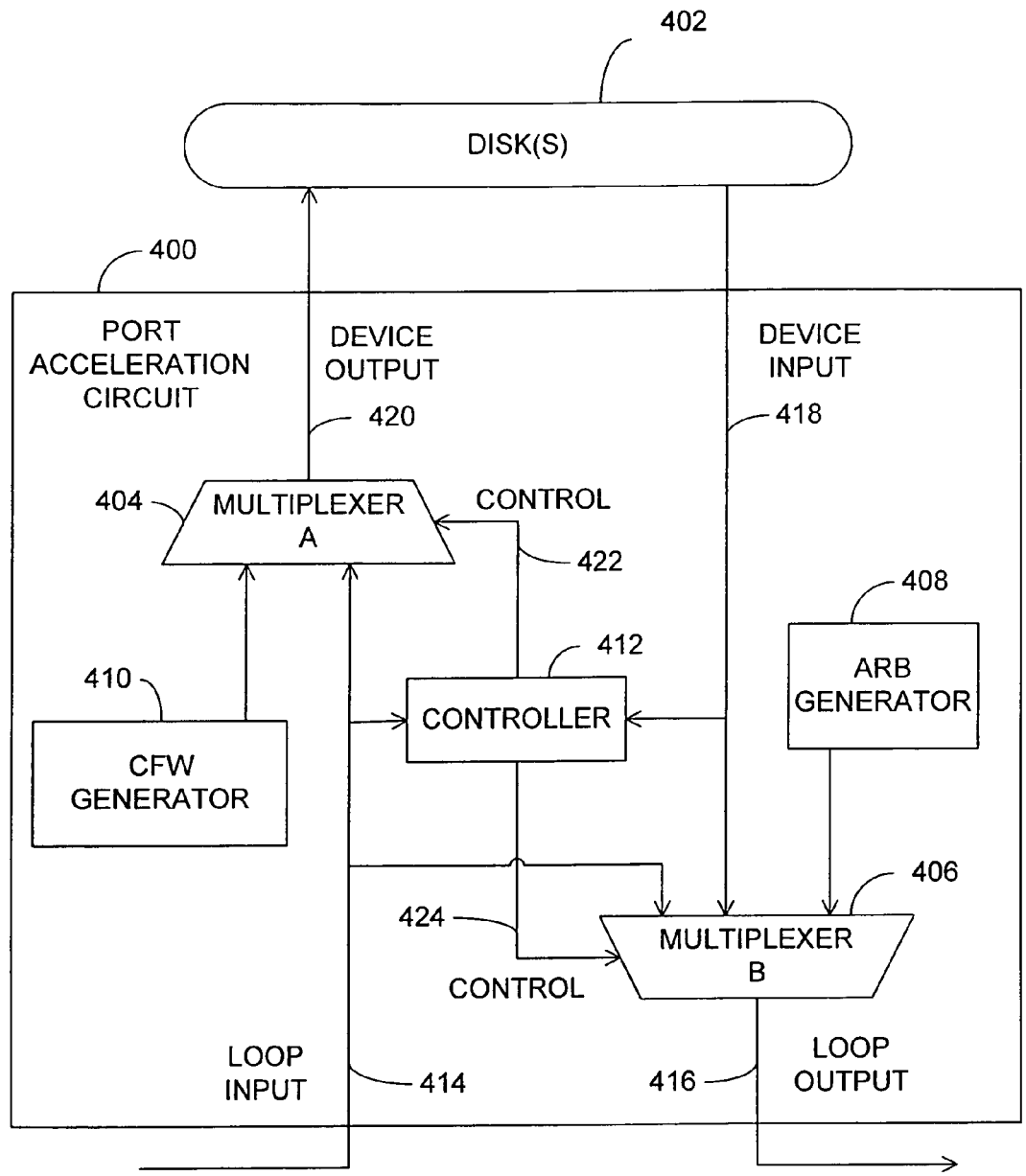
FIG. 4 is a block diagram of one embodiment of an apparatus for a fibre channel arbitrated loop constructed in accordance with the invention.

FIG. 4 depicts a block diagram of one embodiment of a port acceleration circuit 400 for one or more disk(s) 402 (hereafter referred to as disk 402 for convenience) connected to a fibre channel arbitrated loop. The port acceleration circuit 400 includes two multiplexers, multiplexer A 404 and multiplexer B 406, an ARB generator 408, a current fill word ("CFW") generator 410, and a controller 412.

Multiplexer A 404 determines whether the disk 402 receives data from a loop input 414 or data from the CFW generator 410. As shown in FIG. 4, multiplexer A 404 outputs data to the disk 402 via a device output 420.

Multiplexer B 406 determines whether a loop output 416 receives data from the disk 402 via a device input 418, data from the loop input 414 or data from the ARB generator 408. When the disk 402 is being bypassed, data from the loop input 414 is directed immediately to the loop output 416, resulting in a lower latency than if the data went out to the disk 402 and back.

The ARB generator 408 enables the disk 402 to arbitrate for access to the loop when the disk 402 is being bypassed. This may be accomplished, for example, by generating ARB (AL_PA) primitives with the AL_PA of the attached disk 402.

The CFW generator 410 in combination with multiplexer A 404 overwrites the data not destined for the attached disk 402 when the disk 402 is being bypassed. Specifically, CFWs are sent to the disk 402 in this mode.

The controller 412 examines data from the loop input 414 and data from the disk 402 and, in one embodiment, makes a decision about how to set the control signals 422 and 424 for multiplexer A 404 and multiplexer B 406, respectively, on a word-by-word basis.

In the embodiment of FIG. 4, the loop input 414, loop output 416, device output 420 and device input 418 may comprise relatively simple connections. For example, if the loop medium is wire based, the connections may comprise connectors and wires that connect the multiplexers 404 and 406 to the loop and disk 402. Such a relatively simple and inexpensive construction may be possible, for example, through the use of multiplexers that do not significantly affect the signals from the loop or the device.

Figure 5:
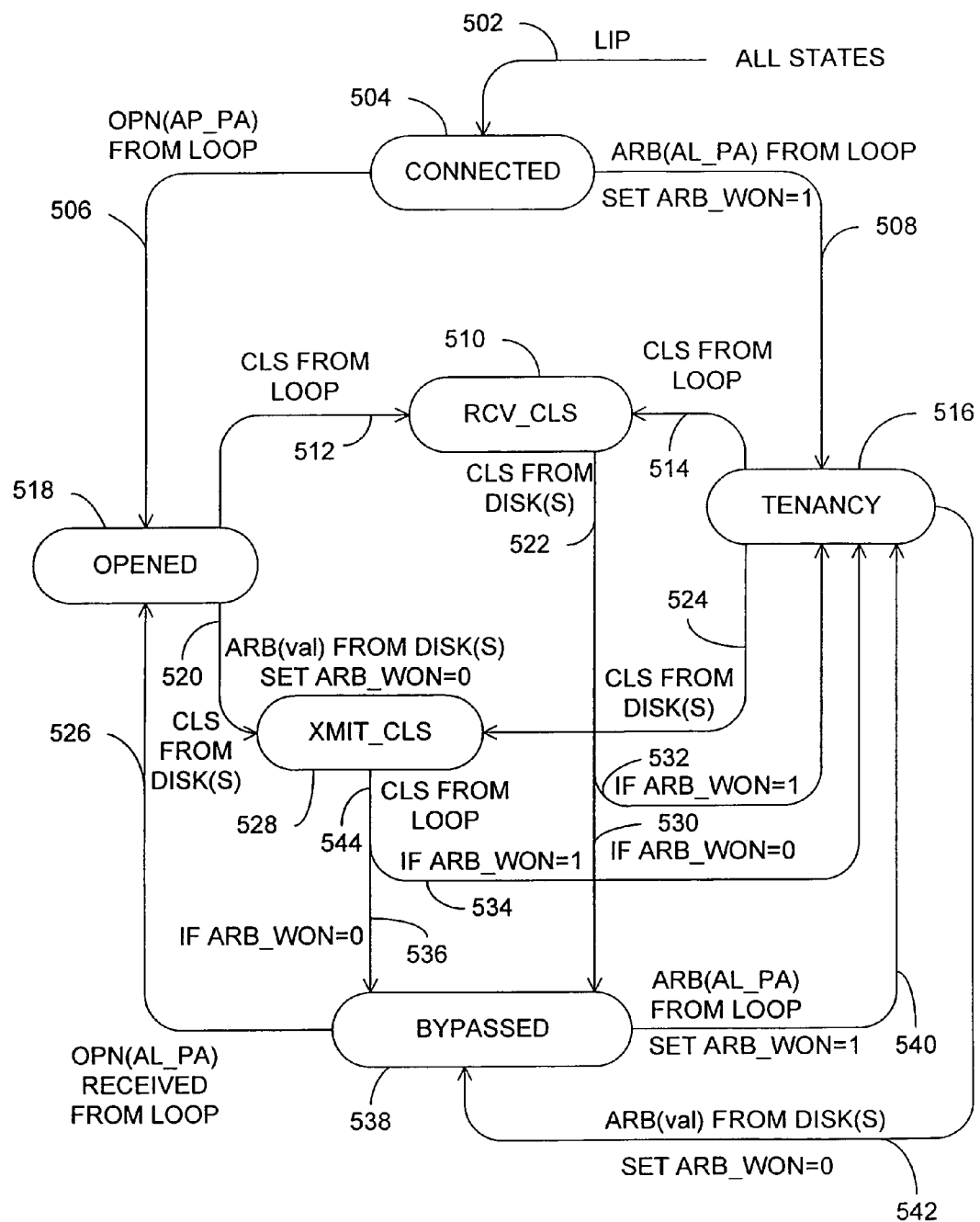
FIG. 5 is a one embodiment of a state diagram that may be implemented in one embodiment of an apparatus constructed in accordance with the invention.

FIG. 5 depicts one embodiment of a state diagram for the controller 412. The rules governing the operation of the controller 412 may be summarized as follows:

1. As represented by lines 508 and 540, if ARB(val) is received from the loop, and val is equal to the AL_PA of an associated disk, the controller 412 transitions to the TENANCY state 516. In addition, a state variable ("ARB_WON") is set to a 1. ARB_WON is used to indicate whether one of the disks associated with the controller has successfully arbitrated for control of the loop. The ARB forwarded to the disk that won the arbitration causes the disk to enter the ARBITRATION_WON state and begin its loop tenancy.

2. From the TENANCY state 516, three state changes are depicted in FIG. 5:

2a. As represented by line 542, if ARB (val) is received from an associated disk and val does not equal the AL_PA of an associated disk, transition to the BYPASSED state 538 and set ARB_WON=0. This ends the loop tenancy of an associated disk.

2b. As represented by line 524, if CLS is received from an associated disk, transition to the XMIT_CLS state 528 to indicate that the disk has entered the XMIT_CLS state.

2c. As represented by line 514, if CLS is received from the loop, transition to the RCV_CLS state 510. The CLS forwarded to an associated disk causes the disk to enter the $RCV_{13}$CLS state.

3. As represented by lines 506 and 526, if OPNy is received from the loop, where y is equal to the AL_PA of an associated disk, transition to the OPENED state 518. The OPN forwarded to the disk with y=AL_PA causes it to enter the OPENED state and begin receiving frames.

4. From the OPENED state 518, two state changes are depicted in FIG. 5;

4a. As represented by line 520, if CLS is received from an associated disk, transition to the XMIT_CLS state 528. The disk has entered the XMIT_CLS state.

4b. As represented by line 512, if CLS is received from the loop, transition to the RCV_CLS state 510. The CLS forwarded to an associated disk causes the disk to enter the RVC_CLS state.

5. In the XMIT_CLS state 528:

5a. if ARB (val) is received from an associated disk and val does not equal the AL_PA of an associated disk, set ARB_WON=0.

5b. When CLS is received from the loop, as represented by line 544, two possible state changes are depicted in FIG. 5. As represented by line 534, if ARB_WON=1, transition to the TENANCY state 516. As represented by line 536, if ARB_WON=0, transition to the BYPASSED state 538.

6. In the RCV_CLS state 510, when CLS is received from an associated disk, as represented by line 522, two possible state changes are depicted in FIG. 5. As represented by line 532, if ARB_WON=1, transition to the TENANCY state 516. As represented by line 530, if ARB_WON=0, transition to the BYPASSED state 538.

Multiplexer A 404 (FIG. 4) selects CFW whenever the controller 412 is in the BYPASSED state. This ensures that the disk 402 does not receive any data frames destined for another disk in the loop. In all other states, multiplexer A 414 selects loop input data 414.

Multiplexer B 406 selects loop input data 414 whenever the controller 412 is in the BYPASSED state (if an associated disk 402 is not arbitrating). When the disk 402 arbitrates, multiplexer B 406 replaces any IDLE primitives or lower priority ARB primitives received on the loop with the ARB of the attached disk (e.g., the output of the ARB generator 408). In all other states, multiplexer B 406 selects data from the disk(s) 402.

Figure 6:
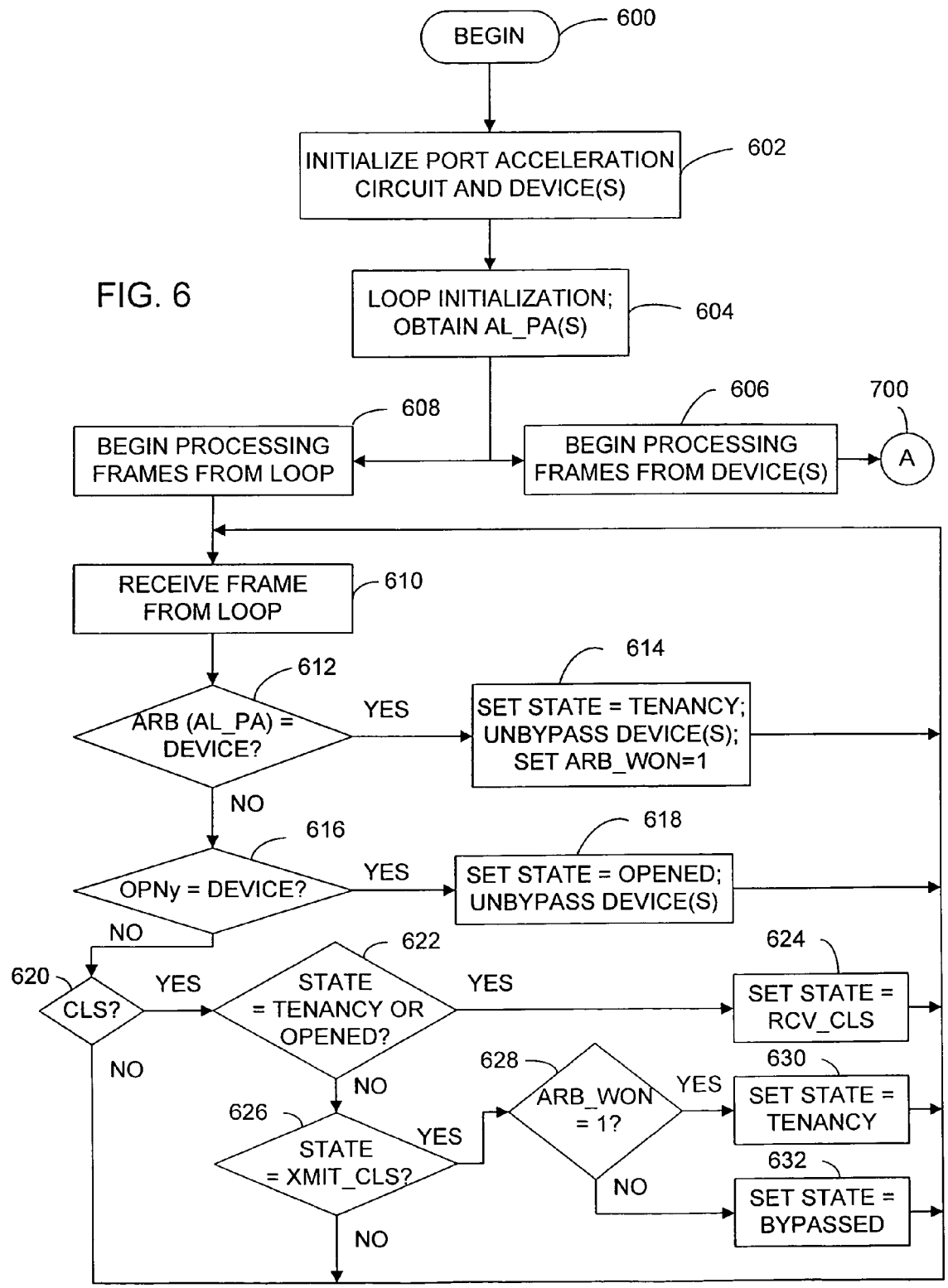
FIG. 6 is a flow diagram of operations related to data output to a data loop that may be performed by one embodiment of an apparatus constructed in accordance with the invention.
Figure 7:
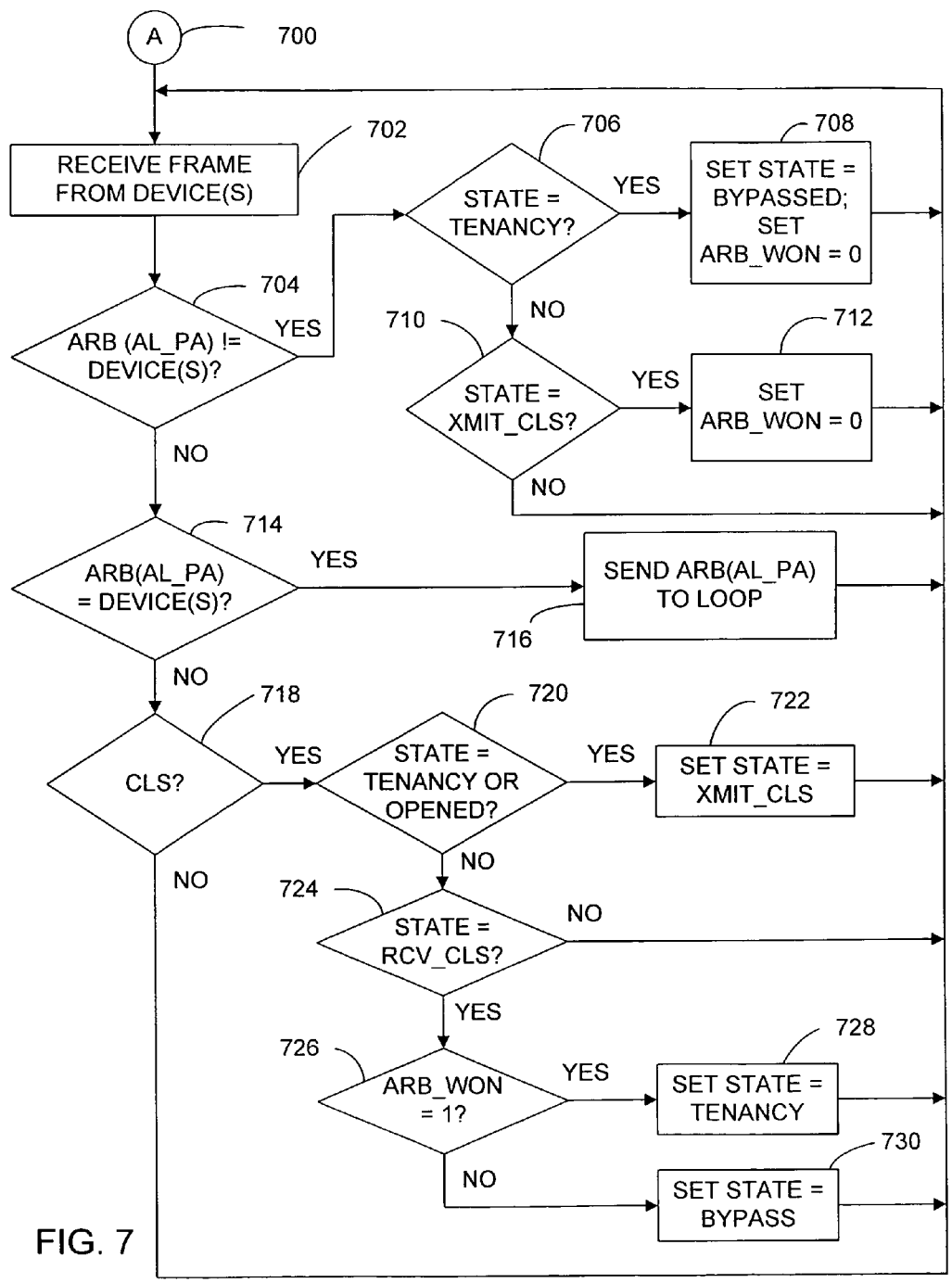
FIG. 7 is a flow diagram of operations related to data input from a data loop that may be performed by one embodiment of an apparatus constructed in accordance with the invention.

FIGS. 6 and 7 are flowcharts of operations that may be performed by one embodiment of an apparatus constructed in accordance with the invention. FIG. 6, blocks 602 and 604, describe several initialization operations. Blocks 608-632 in FIG. 6 describe several operations that may be performed by a port acceleration circuit when it receives data from the loop. Several operations that may be performed by a port acceleration circuit when it receives data from a device (e.g, a disk) are described commencing at FIG. 6, block 606, and continuing to FIG. 7 as represented by off-page reference A 700. In the embodiment of FIG. 4, many of these operations are performed by the controller 412.

As represented by block 602, when the port acceleration circuit is first initialized it sets the state to CONNECTED 504 (FIG. 5) and sets ARB_WON=0. As a result, multiplexer A and multiplexer B are configured to allow data to flow from the loop to the device(s) and vise versa. Hence, the device(s) attached to the port acceleration circuit will be able to communicate with the loop, thereby enabling the device(s) to connect to the loop.

The port acceleration circuit (e.g., its controller 412) continuously monitors the frames flowing through the loop. This enables the port acceleration circuit to change the state based on fibre channel primitives flowing in the loop.

As represented by block 604, after a device is initially connected to the loop it may generate a loop initialization primitive ("LIP") to commence initialization of the loop. During the LIP procedure, the device on the loop each send an LIP and exchange a series of messages. As part of this procedure, each of the devices is assigned a unique AL_PA.

During normal operation, the port acceleration circuit makes several decisions based on whether the AL_PA in a primitive matches the AL_PA of a device associated with (e.g., connected to) the port acceleration circuit. Therefore, the port acceleration circuit acquires the AL_PAs of all attached device. The port acceleration circuit may acquire the AL_PAs of the attached devices in any number of ways.

For example, if the AL_PAs are fixed, the port acceleration circuit may be programmed with the AL_PAs of the attached devices.

Alternatively, the port acceleration circuit may learn the AL_PAs of the attached devices by observing traffic on the loop. As referred to above, the FC-AL standard describes a procedure for devices to obtain a unique AL_PA from a pool of available AL_PAs. During a loop initialization, devices exchange a pre-defined sequence of messages to indicate the AL_PA chosen by each device. When a device chooses an AL_PA, it modifies the initialization messages to notify other devices on the loop that it has taken that AL_PA.

By watching these initialization messages, the port acceleration circuit can determine the AL_PAs of its attached (e.g., associated) devices. For example, at the beginning of loop initialization, the loop initialization master ("LIM") transmits a sequence of frames containing an AL_PA bit map, where each bit corresponds to an available AL_PA. When a device chooses an AL_PA, it sets the corresponding bit in the AL_PA bit map. Then, at the end of loop initialization, the LIM transmits a sequence of frames containing a list of all the AL_PAs in use on the loop.

If the LIM is not an attached device, the port acceleration circuit can determine the AL_PAs claimed by the attached devices by observing changes in the AL_PA bit map between initialization frames sent to the attached devices and initialization frames received from the attached devices.

If the LIM is an attached device, the port acceleration circuit can determine the AL_PAs claimed by the attached devices by observing the list of AL_PAs in use on the loop, and then subtracting the AL_PAs claimed by non-attached devices. The port acceleration circuit can determine the AL_PAs claimed by non-attached devices by observing changes in the AL_PA bit map between initialization frames received from the LIM and initialization frames sent to the LIM.

Referring again to FIG. 5, as represented by line 502, when the port acceleration circuit receives an LIP the port acceleration circuit transitions to the CONNECTED state 504. This transition may occur from any of the states depicted in FIG. 5. For example, as devices are added to the loop, the LIP procedure will be performed to add the new devices to the loop and assign AL_PAs. Accordingly, the port acceleration circuit may receive an LIP during any of the states depicted in FIG. 5.

Referring again to FIG. 6, after the port acceleration circuit and its associated device(s) are initialized, the port acceleration circuit continues to monitor frames received from the device(s) and the loop as represented by blocks 606 and 608, respectively.

The state will remain CONNECTED until a device connected to the port acceleration circuit successfully arbitrates for control of the loop or is opened by a device in control of the loop. These operations are represented by blocks 610-632 which involve the processing of data frames received from the loop.

If a received frame includes ARB (AL_PA) where AL_PA is the AL_PA of the device connected to the port acceleration circuit, the device has successfully arbitrated for control of the loop (block 612). In this case, as represented by block 614, the port acceleration circuit sets the state variable to TENANCY 516 and sets ARB_WON=1.

If necessary, the port acceleration circuit reconfigures the multiplexers 404 and 406 to unbypass the device(s). For example, the port acceleration circuit may send a control signal to multiplexer A to select the loop input 414 as the sourced or data for multiplexer A and send a control signal to multiplexer B to select the device input 418 as the source of data for multiplexer B.

As a result, the received frame will be routed to the device(s) and the device that won the arbitration can begin its tenancy of the loop. The port acceleration circuit also may continue to monitor incoming frames from the loop to detect any traffic that would necessitate a change of state (block 610).

As represented by block 616, if the frame includes OPNy where y is the AL_PA of a device connected to the port acceleration circuit, the device is being opened by a device that has control of the loop. In this case, as represented by block 618, the port acceleration circuit sets the state variable to OPENED 518.

If necessary, the port acceleration circuit unbypasses the device(s). As discussed above, this may involve sending a control signal to multiplexer A to select the loop input 414 as the source of data for multiplexer A and sending a control signal to multiplexer B to select the device input 418 as the source of data for multiplexer B.

The received frame will be routed to the device and the device may then begin processing data from the device that sent the OPNy. Again, the port acceleration circuit also may continue to monitor incoming frames from the loop to detect any traffic that would necessitate a change of state (block 610.

As represented by block 620, if the frame includes a CLS, the port acceleration circuit determines whether the state is either TENACY 516 or OPENED 518 (block 622). If the state is either of these, the state is set to RCV_CLS 510 (block 624) and the port acceleration circuit continues processing frames as discussed above.

As represented by block 626, if the state is instead XMIT_CLS 528, the port acceleration circuit determines whether ARB_WON is set to a 1 (block 628). If so, the state is set to TENANCY 516 (block 630) and the port acceleration circuit continues processing frames as discussed above.

If at block 628 ARB_WON is set to a 0, the state is set to BYPASSED 538 (block 632). As a result, the device(s) attached to the port acceleration circuit will be bypassed. This may be accomplished, for example, as depicted in FIG. 4 by sending a control signal to multiplexer B to select the loop input as the source of data for multiplexer B and sending a control signal to multiplexer A to select CFW as the source of data for multiplexer A. The port acceleration circuit then continues processing frames as discussed above.

Referring now to FIG. 7, operations performed in conjunction with the processing of frames received from the device(s), block 702, will now be discussed. As represented by block 704, if the frame includes ARB (AL_PA), where AL_PA is not the AL_PA of a device connected to the port acceleration circuit, the port acceleration circuit checks the current state. As represented by block 706, if a connected device had previously won tenancy (i.e., state=TENANCY 516), the device's tenancy of the loop has now ended. In this case, as represented by block 708, the port acceleration circuit sets the state variable to BYPASSED 538 and sets ARB_WON to a 0. The port acceleration circuit also sends a control signal to multiplexer A to select CFW as the source of data for multiplexer A and sends a control signal to multiplexer B to select the loop input as the source of data for multiplexer B.

The ARB (AL_PA) primitive will be routed to the loop, after which data flowing through the loop will bypass the device(s) until the state changes back to either OPENED or TENANCY. The port acceleration circuit also may continue to monitor incoming frames from the device(s) to detect any traffic that would necessitate a change of state (block 702).

As represented by block 710 if the state is XMIT_CLS 528 instead of TENANCY, the port acceleration circuit sets ARB_WON to a 0. The port acceleration circuit then continues processing frames as discussed above.

As discussed above, the port acceleration circuit may send an ARB for a device when the state is BYPASSED 538 (block 714). As represented by block 716, if the frame includes ARB(AL_PA), where AL_PA is equal to the AL_PA of a device connected to the port acceleration circuit, the port acceleration circuit sends a control signal to multiplexer B to select the ARB generator as the source of data for multiplexer B as appropriate (that is, the ARB will replace any IDLE primitive or lower priority ARB primitive received from the loop). The ARB generator outputs an ARB primitive corresponding to the appropriate device and this primitive is then sent to the loop by multiplexer B in place of IDLE primitives and lower priority ARB primitives received from the loop. The port acceleration circuit also may continue to monitor incoming frames from the device(s) to detect any traffic that would necessitate a change of state (block 702).

As represented by block 718, if the frame includes CLS, the device that has control of the loop has terminated the current conversation. The port acceleration circuit then determines whether the state is either TENACY 516 or OPENED 518 (block 720). If the state is either of these, the state is set to XMIT_CLS 528 (block 722) and the port acceleration circuit continues processing frames as discussed above.

As represented by block 724, if the state is instead RCV_CLS 510, the port acceleration circuit determines whether ARB_WON is set to a 1 (block 726). If so, the state is set to TENACY 516 (block 728) and the port acceleration circuit continues processing frames as discussed above.

If at block 726 ARB_WON is set to a 0, the state is set to BYPASSED 538 (block 730). As a result, the device(s) attached to the port acceleration circuit will be bypassed.

Data flowing through the loop will bypass the device(s) until the state changes back to either OPENED or TENANCY. The port acceleration circuit also may continue to monitor incoming frames from the device(s) to detect any traffic that would necessitate a change of state (block 702).

In one embodiment, the operations described in FIGS. 6 and 7 may be implemented in software executing on a processor. For example, the processing and routing circuit of FIG. 2 may include a processor, data buffers and associated data memory (not shown). In response to incoming data frames, the processor may forward the data frames to the device(s) or loop, as discussed herein. Also, the processor may insert data such as the ARB primitive and the CFW discussed in conjunction with FIGS. 4 and 5.

Figure 8:
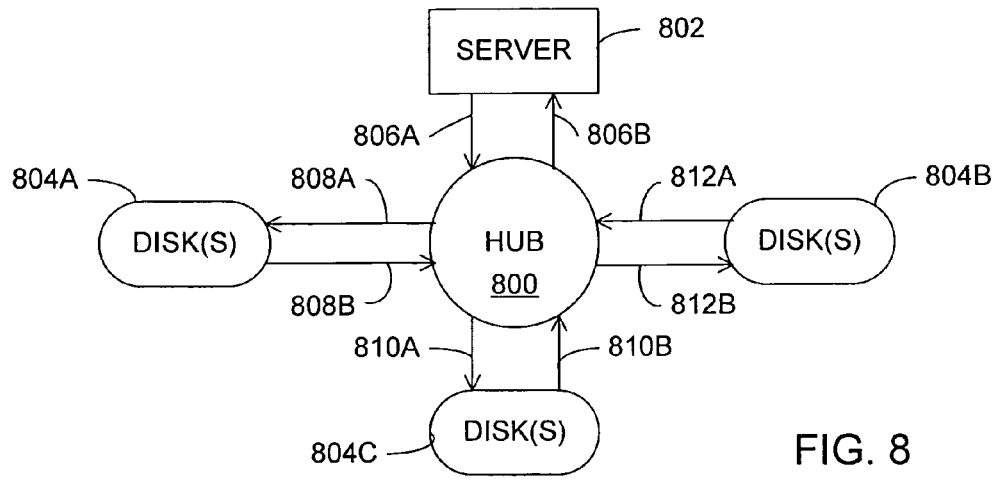
FIG. 8 is a block diagram of one embodiment of a data loop system including a hub constructed in accordance with the invention.

FIG. 8 depicts one embodiment illustrating how a loop that includes a hub 800 may be constructed according to the invention. Data flowing through the loop passes through the hub 800, then flows to one or more device(s) (e.g., server 802 or one or more disks(s) 804A-C), then back to the hub 800, and so forth. This data flow through the loop is represented by lines 806A-B, 808A-B, 810A-B and 812A-B. One advantage of a hub architecture it that the hub 800 may provide some management capabilities for the loop. For example, a hub may bypass disks that have failed.

In the embodiment of FIG. 8, the hub 800 includes port acceleration circuits (not shown) for the devices connected to the loop. This embodiment has a further advantage that the data need not traverse the section of the loop from the hub to the device(s) when a port acceleration circuit is bypassing a device or devices.

Figure 9:
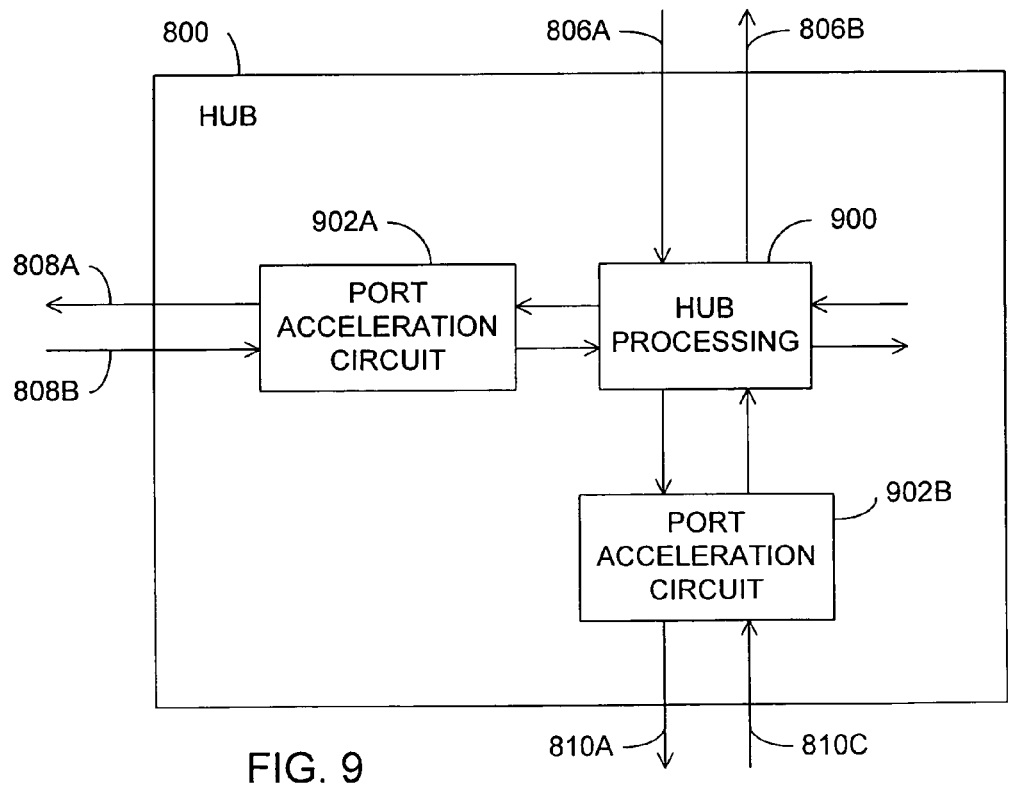
FIG. 9 is a block diagram of one embodiment of a hub constructed in accordance with the invention.

One embodiment of a portion of the hub of FIG. 8 is depicted in FIG. 9. Data from the server 802 flows to hub processing 900 via the loop as represented by line 806A. Data to be sent to disk(s) 804A from the hub 800 is routed to a port acceleration circuit 902A. The port acceleration circuit 902A operates essentially as discussed herein. Hence, the port acceleration circuit 902A may route data to the next port of the hub instead of to the disk(s) 804A. That is, the port acceleration circuit 902A may immediately route the data back to the hub processing 900, rather than to the disk(s) 804A.

Figure 10:
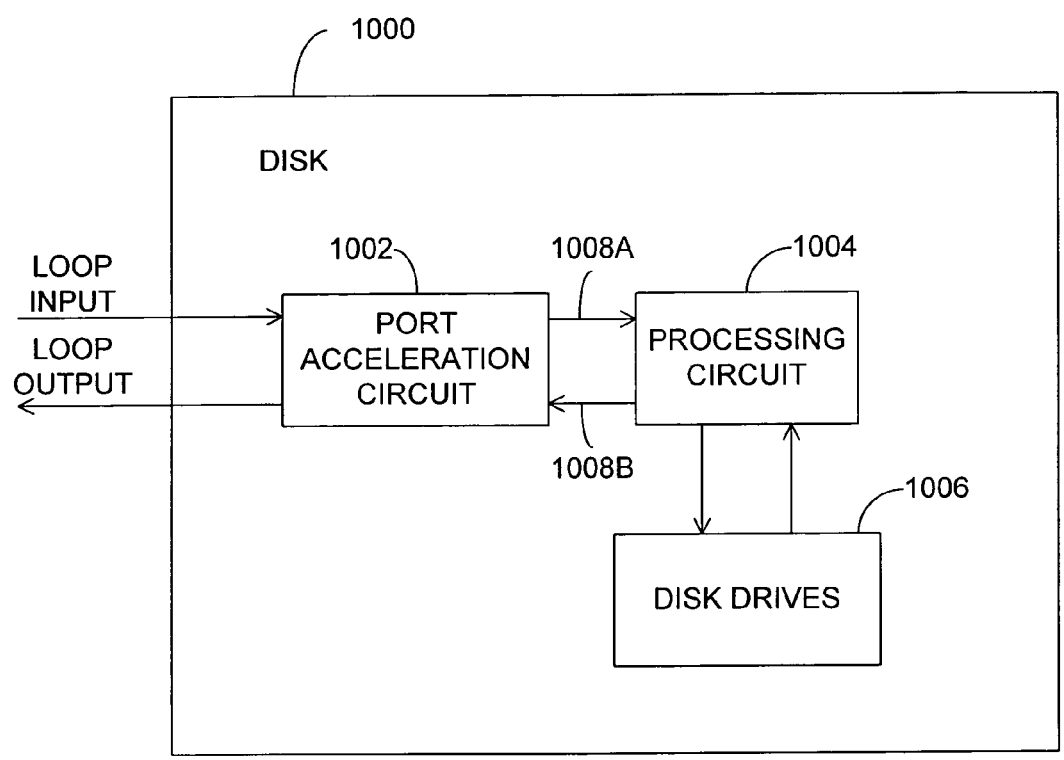
FIG. 10 is a block diagram of one embodiment of a device constructed in accordance with the invention.

FIG. 10 depicts one embodiment of a device that includes a port acceleration circuit constructed according to the invention. As discussed herein, the device may be, for example, a disk 1000. As FIG. 10 illustrates, a port acceleration circuit 1002 as discussed herein may be incorporated within the disk 1000. In this case, the device output 1008A and device input 1008B may consist of, for example, lead lines on a circuit board. Typically these lead lines will connect via buffers (not shown) to a processing circuit 1004 for the disk 1000. For example, the disk 1000 may include one or more processors that handle the fibre channel protocol and route data to and from one or more disk drives 1006. This embodiment has an advantage that no external port acceleration circuitry is needed for the disk 1000.

Other embodiments of the invention may incorporate different data communication topologies, standards and protocols. For example, in some embodiments of an apparatus in accordance with aspects of the invention, the apparatus controls data flow to and from an associated device connected to a token ring network based on whether the device controls the token of the token ring.

As discussed above, different embodiments of the invention may include a variety of hardware and software processing components. In some embodiments of the invention, hardware components such as controllers, state machines and/or logic are used to analyze and route data. In some embodiment of the invention, code such as software or firmware executing on one or more processing devices is used to analyze and route data.

Such components may be combined on one or more integrated circuits. For example, in some embodiments several of these components may be combined within a single integrated circuit. In some embodiments some of the components may be implemented as a single integrated circuit. In some embodiments some components may be implemented as several integrated circuits.

In some embodiments, the port acceleration circuit may be part of a port bypass circuit integrated circuit that enables the disk to be bypassed in the event of a disk failure.

The components and functions described herein may be connected/coupled in many different ways. The manner in which this is done may depend, in part, on whether the components are separated from the other components. In some embodiments some of the connections represented by the lead lines in the drawings may be in an integrated circuit, on a circuit board and/or over a backplane to other circuit boards. In some embodiments some of the connections represented by the lead lines in the drawings may comprise a data network, for example, a local network and/or a wide area network (e.g., the Internet).

The signals discussed herein may take several forms. For example, in some embodiments a signal may be an electrical signal transmitted over a wire, an optical signal transmitted over a fiber optical cable or a wireless signal sent over a wireless medium. Thus, connections/couplings may be made, for example, with physical wire, fiber or wireless connections. Wire connections may include, for example, twisted pair wire or coaxial cable.

Signals as discussed herein also may take the form of data. For example, in some embodiments an application program may send a signal to another application program. Such a signal may be stored in a data memory.

The components and functions described herein may be connected/coupled directly or indirectly. Thus, in some embodiments there may or may not be intervening devices (e.g., buffers) between connected/coupled components.

A wide variety of devices may be used to implement the data memories discussed herein. For example, a data memory may comprise one or more RAM, disk drive, SDRAM, FLASH, EEPROM or other types of data storage devices. A data storage system may, for example, be disk-based or solid state-based.

In summary, the invention described herein generally relates to an improved data routing scheme. While certain illustrative embodiments have been described in detail and shown in the accompanying drawings, it is to be understood that such embodiments are merely illustrative of and not restrictive of the broad invention. In particular, it should be recognized that the teachings of the invention apply to a wide variety of systems and processes. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. A port acceleration apparatus for a fibre channel arbitrated loop, the fibre channel arbitrated loop coupling a plurality of disks, the apparatus comprising:
   at least one fibre channel input configured to receive data from the fibre channel arbitrated loop;
   at least one fibre channel output configured to send data to the fibre channel arbitrated loop;
   at least one device input configured to receive data from at least one of the disks;
   at least one device output configured to send data to the at least one of the disks;
   at least one controller configured to process at least one fibre channel primitive received on the at least one fibre channel input to generate, based on the at least one fibre channel primitive, a plurality of states comprising an indication of what is routed to the at least one fibre channel output and what is routed to the at least one device output;
   a first multiplexer configured to route, in accordance with the plurality of states, data from the at least one fibre channel input or a current fill word to the at least one device output; and
   a second multiplexer configured to route, in accordance with the plurality of states, data from the at least one fibre channel input, data from the at least one device input, or data from an arbitration generator to the at least one fibre channel output.

2. The apparatus of claim 1 wherein the at least one fibre channel primitive includes at least one of an ARB primitive and an OPN primitive.

3. The apparatus of claim 1 wherein the apparatus comprises an integrated circuit.

4. A method for accelerating traffic flow in a fibre channel arbitrated loop that connects a plurality of devices including at least one disk, the method comprising:
   receiving, from the fibre channel arbitrated loop, data comprising at least one fibre channel primitive;
   receiving, from the at least one disk, data comprising at least one fibre channel primitive;
   processing the at least one fibre channel primitives to determine a plurality of states indicative of whether to route data received from the fibre channel arbitrated loop to the at least one disk or to the fibre channel arbitrated loop;
   routing, in accordance with the state determination, the data received from the fibre channel arbitrated loop;
   routing, in accordance with the state determination, the data received from the at least one disk;
   routing, in accordance with the state determination, a current fill word to the at least one disk; and
   routing, in accordance with the state determination, data from an arbitration generator to the fibre channel arbitrated loop.

5. The method of claim 4 wherein the at least one fibre channel primitive includes at least one of an ARB primitive and an OPN primitive.

6. The method of claim 4 further comprising routing, in accordance with the state determination, data received from the at least one disk to the fibre channel arbitrated loop.

7. The method of claim 4 further comprising routing to the at least one disk, in accordance with the determination, data received from the fibre channel arbitrated loop or at least one CFW primitive.

8. The method of claim 4 wherein the processing comprises determining whether the at least one device is authorized to participate in a conversation currently associated with the data loop.

9. The method of claim 4 wherein the processing comprises determining whether the at least one device has successfully arbitrated to gain access to the data loop or is communicating with another device that has successfully arbitrated to gain access to the data loop.

10. The method of claim 4 further comprising routing, in accordance with the state determination, data from the at least one disk to the fibre channel arbitrated loop.

11. The method of claim 4 further comprising the step of routing to the at least one device, in accordance with the state determination, data from the fibre channel arbitrated loop or other data.

12. The apparatus of claim 1, wherein the plurality of states comprises:
   a first state where the current fill word is routed to the at least one device output and the data from the at least one fibre channel input is routed to the at least one fibre channel output;

a second state where the current fill word is routed to the at least one device output and the data from an arbitration generator is routed to the at least one fibre channel output; and a third state where at the data from the least one fibre channel input is routed to the at least one device output and the data from the at least one device input is routed to the at least one fibre channel output.

13. The apparatus of claim 1, wherein the second multiplexer routes data from the at least one fibre channel input to the at least one fibre channel output with delay less than three fibre channel words.

14. The apparatus of claim 1, wherein the arbitration generator arbitrates fibre channel arbitrated loop access for the at least one disk.

* * * * *

UNITED STATES PATENT AND TRADEMARK OFFICE
CERTIFICATE OF CORRECTION

PATENT NO. : 7,545,817 B1
APPLICATION NO. : 10/724957
DATED : June 9, 2009
INVENTOR(S) : Sawey et al.

Page 1 of 1

It is certified that error appears in the above-identified patent and that said Letters Patent is hereby corrected as shown below:

At Column 2, Line 47, Delete "lop." and insert --loop.--

At Column 4, Line 15, Delete "110A-I" and insert --100A-I--

At Column 5, Line 53, Delete "may" and insert --many--

At Column 6, Line 56, Delete "OPM" and insert --OPN--

At Column 7, Line 67, Delete "$RCV_{13}CLS$" and insert --RCV_CLS--

At Column 8, Line 7, Delete "FIG. 5;" and insert --FIG. 5:--

At Column 8, Line 14, Delete "RVC_CLS" and insert --RCV_CLS--

At Column 8, Line 50, Delete "e.g," and insert --e.g.,--

At Column 9, Line 4, Delete "device" and insert --devices--

At Column 9, Line 12, Delete "device" and insert --devices--

At Column 9, Line 21, After "During" delete "a"

At Column 10, Line 14, Delete "sourced or" and insert --source of--

At Column 12, Line 1, Delete "disks(s)" and insert --disk(s)--

At Column 12, Line 47, Delete "embodiments" and insert --embodiment--

Signed and Sealed this

Sixth Day of July, 2010

David J. Kappos
*Director of the United States Patent and Trademark Office*